Nov. 20, 1951
R. W. GILBERT
2,575,951
INTEGRATING APPARATUS
Filed Dec. 10, 1946
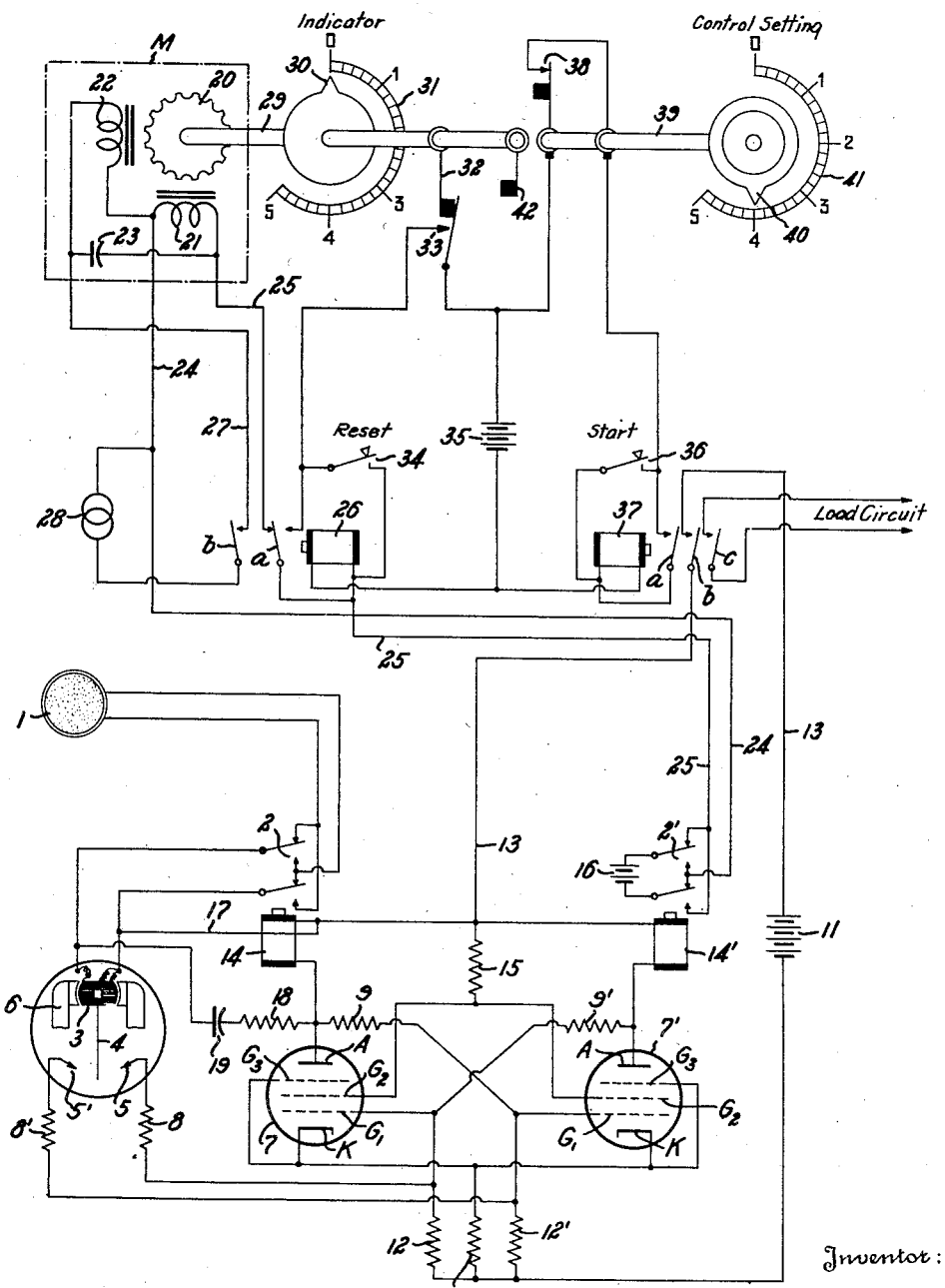

Patented Nov. 20, 1951

2,575,951

UNITED STATES PATENT OFFICE 2,575,951

INTEGRATING APPARATUS

Roswell W. Gilbert, Montclair, N. J., assignor to Weston Electrical Instrument Corporation, Newark, N. J., a corporation of New Jersey Application December 10, 1946, Serial No. 715,282

11 Claims. (Cl. 175—320)

1

This invention relates to apparatus for integrating a variable quantity against time, and more particularly to electrical apparatus for integrating a voltage or current which varies in magnitude with a factor such as temperature or light. The invention is particularly useful in the photoelectric integration of light values against time to determine the exposure time in photo-engraving and other photographic reproduction processes.

The essential element of the electrical integrating apparatus is a permanent magnet-moving coil instrument having no mechanical restoring force and so designed and constructed that the angular velocity of the moving coil is proportional to the current or the voltage applied to the coil. An integrating instrument of this type is described and claimed in my prior Patent No. 2,239,363, Integrating Apparatus, granted April 22, 1941.

An object of the present invention is to provide integrating apparatus of improved structural and/or operating characteristics. An object is to provide an integrating apparatus in which the accumulated value is registered by a synchronous motor, such as a clock motor, which is advanced step-by-step by direct current pulses and which is reset by alternating current. An object is to provide an integrating apparatus in which the successive contact closures of an integrating instrument develop step-by-step advances of a counting mechanism through a pair of polarity-reversing switches controlled by relays in the anode circuits of two cross-connected tubes which are alternately rendered conductive by bias voltages applied by the integrating instrument, the initiation of conduction in one tube operating to block the other tube. An object is to provide an integrating apparatus in which the voltage across the integrating instrument contacts is relatively high to obtain reliable contact closures through electrostatic attractive forces.

These and other objects and advantages of the invention will be apparent from the following specification when taken with the accompanying drawing in which the single view is a schematic circuit diagram of a photoelectric integrator embodying the invention.

The light-sensitive element of the integrating apparatus is a photocell 1 of the barrier layer type which is connected through a polarity-reversing switch 2 to an integrating instrument having a moving coil 3 carrying a contact arm 4 which moves between relatively fixed contacts 5,

2

5'. The instrument construction is similar to that of sensitive milliameters and microammeters of the permanent magnet, pivoted coil type but differs therefrom, as explained in my prior patent, in that the spring connections to the moving coil impose substantially no torque load on the moving system, and the coil is wound upon a metal frame, or is shunted by a resistance, which introduces a restraining force such that the angular velocity of the coil is proportional to the applied current or voltage. The coil 3 oscillates in the magnetic field between the poles of a permanent magnet 6, and each half-cycle of movement of the contact arm 4 from one relatively fixed contact to the other corresponds to a preselected quantity of light, in foot-candle-seconds or meter-candle-seconds, falling upon the photocell 1. The total quantity of light for any time period may therefore be measured by counting the number of half-cycles or of cycles of oscillatory movement of the contact arm 4 of the integrating instrument.

The apparatus for operating the polarity-reversing switch and the counting system includes a pair of vacuum tubes 7, 7', preferably of the pentode type, with the output of each tube connected back to the input of the other. The circuit is unstable, due to these regenerative cross-connections, and normally falls to one side or the other, leaving one tube conducting and the other tube blocked. If the blocked tube is forced into a conducting state, by momentarily making the control grid positive, the circuit will reverse and fall over to the other side, remaining there until the other tube is forced into the conducting region in a similar manner. The tubes 7, 7' are forced into conduction in alternation by impressing positive potentials on their control grids through the integrating instrument contact arm 4 and contacts 5, 5', respectively, and relays are arranged in the anode circuits of the tubes 7, 7' to control the polarity-reversing switch 2 and the circuit of an electrically operated counting mechanism, respectively.

More specifically, the circuit network includes connections from the integrating instrument contacts 5, 5' to the control grids $G_1$ of tubes 7, 7' through current limiting resistors 8, 8', respectively. The anode A of each tube is connected to the control grid of the other tube through a resistor 9, 9' respectively, and the tube cathodes K are connected through a common cathode resistor 10 to a direct current source 11 of anode potential which is shown schematically as a battery. Grid resistors 12, 12' are connected between the respective control grids G₁ and the negative terminal of the current source 11. Positive potential is applied to the anodes A through a common lead 13 under control of a relay switch which will be described later, and through relays 14, 14' respectively. The screen grids G₂ are energized in parallel from lead 13 through a resistor 15, and the suppressor grids G₃ are connected to their respective cathodes K.

The anode circuit relay 14 of tube 7 controls the polarity-reversing switch 2 through which the photocell 1 is connected to coil 3 of the integrating relay, and the relay 14' of tube 7' controls the operation of a counting device which may be of the "predetermined counter" type described in my prior patent. It is preferable however, as illustrated, to provide the relay 14' with contacts which form a polarity-reversing switch 2' for connecting a direct current source 16, which is shown schematically as a battery, to a motor type of counting device.

The contact arm 4 of the integrating instrument is connected to one terminal of the moving coil 3, and a relatively high voltage, for example of the order of 100 volts, is impressed upon the contact arm 4 through a jumper 17 which connects that terminal of the coil to the anode lead 13. The high voltage across the relay contacts insures reliable contact closures through electrostatic attraction when the coil 3 moves slowly at low input levels corresponding to low light intensities at the photocell 1. Free separation of the contacts is insured by injecting a small current surge into the coil 3, upon each reversal of the tube circuit, through a resistor 18 and condenser 19 connected between anode A of tube 7 and the other side of coil 3. The current surge is derived from the change in anode potential upon reversal of the tube circuit, and the polarity is always such as to facilitate contact separation upon reversal in either direction.

The operating element of the counting and control apparatus is a small reversible motor M which is preferably a conventional clock motor comprising a permanent magnet rotor 20, a "forward" field winding 21, a "reverse" field winding 22, and a phase-shifting condenser 23 connected across the windings. The common lead 24 of the field windings is connected to one set of contacts of the polarity-reversing switch 2', the other lead 25 of the forward winding 21 is normally connected to the other set of contacts of switch 2' through the back contact and blade a of a resetting relay 26, and the second lead 27 of the reverse winding 22 is connected to the front contact of blade b of the same relay. An alternating current source 28 is connected between the blade b and the lead 24. With relay 26 de-energized as illustrated, cycles of energization and de-energization of the relay 14' actuate the polarity-reversing switch 2' to supply direct current pulses of alternating polarity to the forward winding 21, from the current source 16, to effect a step-by-step advance of the rotor 20. When relay 26 is energized, this direct current circuit is broken at blade a, and the alternating current source is connected across the reverse winding 22 to drive the rotor 20 in the reverse direction.

The motor shaft 29 carries a pointer 30 which moves over a graduated scale 31 of meter-candle-seconds, and also an arm 32 for opening a stop switch 33 in the energizing circuit of resetting relay 26 when the reverse rotation of the motor by energization of field winding 22 has returned the pointer 30 to the zero scale graduation. The energizing circuit of relay 26 includes, in series with the stop switch 33, a manually operable reset switch 34 and a current source 35 which is shown schematically as a battery. The blade a of relay 26 and its front contact form a holding switch in parallel with the reset switch 34 to maintain the relay 26 in energized condition until the holding circuit is opened at the stop switch 33.

The apparatus is placed in operation by manually closing a starting switch 36 to close a starting circuit which includes in series a starting relay 37, the current source 35, and a normally closed control switch 38. Blade a of the relay 37 engages a front contact to form a holding switch in parallel with the manually operated starting switch 36. Blade b and a front contact form a switch, as previously mentioned, in the lead 13 from the voltage source 11 to the anodes of tubes 7, 7', and blade c and a front contact form a load circuit switch for energizing a load circuit, such as the circuit of the lamps illuminating the easel or other surface at which the photocell 1 is located.

The normally closed control switch 38 is mounted on a manually adjustable shaft 39 carrying a pointer 40 which is movable along a cooperating scale 41 of meter-light-seconds. The control switch 38 is opened by a pusher arm 42 on the motor shaft 29 when the integrated light value, as registered by the position of indicating pointer 30 on scale 31, is equal to the preselected light value which was set manually on the control scale 41, for example the illustrated value "4" which may be an arbitrary graduation or which may indicate $4 \times 10^6$ meter-candle-seconds.

For simplicity of illustration, batteries have been shown schematically as the energizing current and voltage sources but it is to be understood that it is preferable, in general, to energize the integrating apparatus from an alternating current power line through a conventional rectifier and filter assembly such as commonly termed a "power pack." The several circuit elements are illustrated in the drawing in the positions which they occupy at the close of a resetting operation and before the actuation of the manually operated starting switch 36. The apparatus is placed in operation by closing the switch in the heating circuit, not shown, of the cathodes K of the tubes 7, 7' and, after an interval depending upon the characteristics of the tubes 7, 7', momentarily closing the starting switch 36, thereby energizing the relay 37 to close a holding circuit and to draw in blades b and c to complete the anode circuits of tube 7, 7' and to close the load circuit. Light falling upon the photocell 1 effects a displacement of the contact arm 4 of the integrating instrument and it engages one of the fixed contacts, say contact 5, to apply a positive potential to grid G₁ of tube 7. The tube 7 is forced into conduction and the relay 14 draws in to actuate the switch 2 to reverse the polarity of the photocell current delivered to the integrating instrument. The space current in tube 7 imposes a blocking potential upon the control grid G₁ of tube 7', and operates, through resistor 18 and condenser 19, to inject a current surge into coil 3 to permit the contact arm 4 to separate freely from contact 5 for displacement towards contact 5'. The contact arm 4 engages contact 5' to establish conduction in tube 7' after a time interval which depends upon the light intensity, thereby energizing relay 14' and blocking tube 7 to de-energize relay 14. The polarity-reversing switches 2 and 2' are thus actuated to reverse the direction of motion of coil 3 and contact arm 4, and to reverse the supply of direct current to the forward field winding 21 of motor M; the path of the motor current from source 16 being over the reversing switch 2', leads 24, 25 and blade a of the de-energized reset relay 26. When the contact arm 4 returns to the contact 5, the tube 7 is rendered conductive and the tube 7' is therefore blocked, thereby energizing the relay 14 and de-energizing the relay 14'. Both polarity-reversing switches are shifted to their alternate positions, thereby reversing the polarity of the photocell current to coil 3 of the integrating relay, and reversing the polarity of the direct current supplied to the forward winding 21 of motor M. In addition, a portion of the direct current pulse is delivered to the motor winding 22 through the condenser 23. As is common with all permanent magnet, synchronous clock motors, the field windings 21 and 22 are displaced with respect to the salient poles of the rotor 20. Therefore, direct current pulses applied to the windings will give a preferential rotation to the rotor, i. e., the rotor will rotate a distance of one pole in the same direction regardless of the alternate polarity of the successive pulses applied to the windings by the reversal of the switch 21.

The motor M is thus advanced one step for each engagement of the relay contact arm 4 with either of the relatively fixed contacts 5 and 5', i. e. each accumulated light value-time unit corresponding to a half-cycle of movement of the relay contact arm 4 effects a one-step advance of the motor-driven pointer 30 along the indicator scale 31. The cyclic energization of relays 14 and 14' in alternation continues until the accumulated light-time value, as registered on the indicator 30, 31 reaches the preselected value which was set on the control dial 40, 41. The pusher arm 42 on the motor-driven shaft 29 opens the switch 38 in the holding circuit of the starting relay 37 when this condition is reached, and the relays 37 and 14' drop out to open the load circuit and to remove the anode potential from the tubes 7 and 7'. The apparatus may be reset by momentarily closing the reset switch 34 to complete an energizing circuit for the resetting relay 26. Blade a of the relay 26 opens the lead 25 from current source 16 to the forward winding 21 of motor M, and completes a holding circuit for the relay. Blade b engages its front contact to connect the alternating current source 28 across the reverse field winding 22, and the motor M operates as a synchronous motor to turn shaft 29 counterclockwise to return the indicator pointer 30 to zero scale position. Arm 32 on shaft 29 opens the switch 33 in the holding circuit of relay 26 when the pointer reaches zero, and the resulting deenergization of the resetting relay 26 opens the circuit of the reverse winding 22 and closes the circuit of the forward winding 21. All parts of the apparatus are thus restored to the relative positions illustrated in the drawings.

It is to be understood that the invention is not limited to the particular light integrating apparatus herein shown and described as the current or voltage delivered to the moving coil 3 may be a function of some variable other than light intensity, and changes may be made in the circuits and circuit elements without departure from the spirit and scope of the invention as set forth in the following claims.

I claim:

1. In integrating apparatus, the combination with an integrating instrument including a coil mounted for oscillation in a magnetic field and carrying a contact arm cooperating with a pair of relatively fixed contacts, a source of electrical energy, and a polarity-reversing switch connected between said energy source and said coil, of a pair of vacuum tubes cross-connected to block conduction through one tube when the other tube is conductive, each tube including a cathode cooperating with a control grid and an anode, circuit elements connecting one of said fixed contacts to the control grid of one of said tubes and connecting the other fixed contact to the control grid of the other tube, relays in the anode circuits of said tubes, said reversing switch being controlled by one of said relays, counting mechanism, and means controlled by the second relay for actuating said counting mechanism.

2. In integrating apparatus, the invention as recited in claim 1, wherein said counting mechanism includes a reversible synchronous motor having a shaft carrying a pointer movable over a cooperating scale of integrated values, and said means controlled by said second relay effects a step-by-step operation of the motor in one direction, in combination with manually controlled means for operating said motor in the opposite direction to reset the pointer at the zero graduation of said scale.

3. In integrating apparatus, the invention as recited in claim 1, wherein said counting mechanism comprises a synchronous motor having a rotor and a field winding, a shaft driven by said rotor and carrying a pointer movable along a graduated scale; and said means controlled by the second relay includes a direct current source, a polarity-reversing switch actuated by said second relay, and circuit elements connecting said direct current source to said field winding through the polarity-reversing switch actuated by said second relay.

4. In integrating apparatus, the invention as recited in claim 1, wherein said counting mechanism comprises a reversible synchronous motor having a rotor and a pair of field windings for operating said rotor in forward and reverse directions, a shaft driven by said motor and carrying a pointer movable over a graduated scale; and said means controlled by said second relay includes a direct current source, and a polarity-reversing switch actuated by said second relay connected between said direct current source and the field winding for operating said rotor in forward direction; and said manually controlled means includes a source of alternating current and switch means for connecting said alternating current source across the other field winding to operate the motor in reverse direction to reset the pointer at the zero graduation of said scale.

5. In integrating apparatus, the combination with a source of electrical energy of fluctuating magnitude, an integrating instrument including an oscillating coil carrying a contact arm movable between two relatively fixed contacts, a polarity-reversing switch connected between said energy source and said coil, a second polarity-reversing switch, and relay means controlled by said instrument for actuating both switches from one of their alternate positions to the other upon each engagement of the contact arm with a fixed contact; of a synchronous motor having a forward and a reverse field winding and including a shaft carrying a pointer movable along a graduated scale, a source of direct current, circuit elements including said second polarity-reversing switch connecting said direct current source to the forward winding of said synchronous motor, whereby said motor shaft is advanced one step for each engagement of said instrument contact arm with a fixed contact, a manually controlled starting relay having three sets of switch blades and cooperating front contacts, one set being included in a holding circuit for said starting relay, a second set being included in energizing circuits for said relay means, the third set constituting a load circuit switch, an energizing circuit for said starting switch including a current source in series with a push button switch and an additional switch, means operable by said motor shaft upon movement of said pointer to a preselected point on said graduated scale to open said additional switch, thereby to de-energize said starting relay, a source of alternating current, and manually controlled resetting means for connecting said alternating current source to the reverse field winding of said synchronous motor for operation thereof in reverse direction to reset said pointer at zero scale graduation.

6. In intergrating apparatus, the invention as recited in claim 5, wherein said resetting means including resetting relay having switch contacts for connecting said alternating current source to said reverse field winding, thereby to drive said motor shaft in reverse direction to reset said pointer at zero scale graduation, and means including a manually actuated switch for energizing said resetting relay.

7. In integrating apparatus, the invention as recited in claim 5, in combination with a holding circuit for said resetting relay, a stop switch in said holding circuit, and means on said motor shaft for opening said stop switch when said pointer is reset at zero scale graduation.

8. In integrating apparatus, the combination with a source of electrical energy of a magnitude varying with a preselected factor, and an integrating instrument comprising a coil moving in a magnetic field and carrying a contact arm movable between a pair of relatively fixed contacts, of a pair of electronic tubes each having a cathode cooperating with an anode which is cross-connected to a control grid of the other tube, circuit elements connecting one of said fixed contacts to the control grid of one tube and connecting the other fixed contact to the control grid of the other tube, a source of potential connected between said contact arm and said control grids, relays in the output circuits of said tubes, a polarity-reversing switch controlled by one relay and connected between said source of electrical energy and the moving coil of said integrating instrument, and means controlled by the other relay for totalizing the number of engagements of said contact arm with said fixed contacts of the integrating instrument.

9. In integrating apparatus, the invention as recited in claim 8, wherein said source of potential is of a magnitude establishing an electrostatic attraction between said contact arm and fixed contacts, in combination with means operable upon an engagement of said contact arm with either fixed contact to counteract such electrostatic attraction to facilitate a separation of the contact arm from the engaged fixed contact.

10. The invention as recited in claim 8, wherein the source of electrical energy is of a magnitude establishing an electrostatic attraction between said contact arm and said fixed contacts, in combination with an electrical circuit responsive to the engagement of said contact arm and fixed contacts to inject a current surge into said coil to thereby facilitate separation of the contact arm from the engaged fixed contact.

11. In integrating apparatus, the invention as recited in claim 8, wherein said contact arm is connected to one side of said coil, and said source of potential is of a magnitude establishing an electrostatic attraction between said contact arm and said fixed contacts, in combination with a circuit connection between the other side of said coil and the anode circuit of one of said tubes to inject a current surge into said coil upon engagement of said contact arm with a fixed contact, thereby to facilitate separation of the contact arm from the engaged fixed contact.

ROSWELL W. GILBERT.

REFERENCES CITED

The following references are of record in the file of this patent:

UNITED STATES PATENTS

| Number | Name | Date |
|---|---|---|
| 1,830,756 | Ford | Nov. 10, 1931 |
| 2,239,363 | Gilbert | Apr. 22, 1941 |
| 2,286,036 | Lamb | June 9, 1942 |
| 2,393,014 | Bartholy | Jan. 15, 1946 |
| 2,440,665 | Jeffery | Apr. 27, 1948 |
| 2,446,874 | Geffner et al. | Aug. 10, 1948 |

OTHER REFERENCES

Article by Batcher, "Electronic Industries" for August 1943, pages 65–72 and 216.

Article by Phelps, "Electronics" for July 1945, pages 110–113.